United States Patent [19]

Takimoto et al.

[11] 4,196,983
[45] Apr. 8, 1980

[54] SOUND MOTION PICTURE CAMERA

[75] Inventors: Hiroyuki Takimoto, Urawa; Hidekazu Okajima, Tokyo, both of Japan

[73] Assignee: Canon Kabushiki Kaisha, Tokyo, Japan

[21] Appl. No.: 909,952

[22] Filed: May 26, 1978

[30] Foreign Application Priority Data

May 31, 1977 [JP] Japan .................. 52-63465

[51] Int. Cl.[2] .......................... G03B 31/00
[52] U.S. Cl. ...................... 352/14; 352/27; 352/29
[58] Field of Search .............. 352/14, 27, 28, 29, 352/30, 180, 170, 171

[56] References Cited

U.S. PATENT DOCUMENTS

| 3,205,507 | 9/1965 | Hochstein | 352/171 |
|---|---|---|---|
| 3,782,813 | 1/1974 | Isono | 352/171 |
| 3,972,604 | 8/1976 | Yoshimura et al. | 352/14 |
| 3,982,826 | 9/1976 | Saito | 352/14 |
| 3,989,361 | 11/1976 | Gross | 352/14 |
| 4,003,643 | 1/1977 | Freudenschuss et al. | 352/14 |
| 4,021,104 | 5/1977 | Ito | 352/14 |

Primary Examiner—Russell E. Adams
Attorney, Agent, or Firm—Fitzpatrick, Cella, Harper & Scinto

[57] ABSTRACT

A sound motion picture camera capable of using a sound film is disclosed. The camera includes a film receiving chamber having an image recording location and a sound recording location, a first film feeding device for intermittently transporting a film loaded in the chamber from the image recording location toward the sound recording location, a second film feeding device for transporting the film transported by the first film feeding means further downstream from the sound recording location at a substantially constant speed, a switching device interposed between the first and second film feeding devices and a control device for controlling the operation of the film feeding devices. The switching device is so designed that ON-OFF of the switch is controlled by the movement of the film and that the switch produces pulse signals at an almost constant interval so long as the film transporting operations of the first and second film feeding devices are going well keeping a desired proper operating relation therebetween. But, whenever the operating relation of the two film feeding devices becomes disordered, the switch device continues putting out positive or negative signals. These signals are detected by the control device which terminates the film transporting operations of both the first and second film feeding devices when the ON or OFF signals continue coming out from the switching device for a longer time period than a predetermined time duration.

22 Claims, 11 Drawing Figures

FIG. 6A SWI
FIG. 6B
FIG. 6C
FIG. 6D Tr₁
FIG. 6E
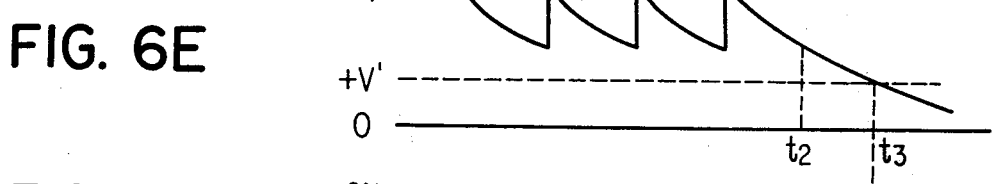
FIG. 6F Tr₂, Tr₃
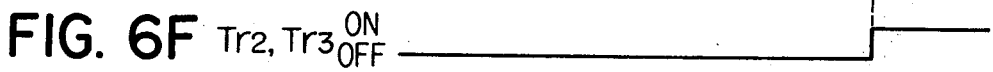

SOUND MOTION PICTURE CAMERA

BACKGROUND OF THE INVENTION

1. Field of the Invention

The present invention relates to a sound motion picture camera.

2. Description of the Prior Art

At present, there is commercially available such type of film for use in motion picture camera which not only optically records image information but also magnetically records sound information on one and the same film. This type of film is generally called "sound film". One example of such type of film is a motion picture film sold by Eastman Kodak Company under the trade name "Sound Movie Film". As to this sound film, a detailed description has been made in U.S. Pat. No. 3,858,968 assigned to Eastman Kodak Company.

As seen from the above mentioned patent specification, this sound film of Eastman Kodak Company is formed by adding a strip of magnetic recording material along one side edge on one surface of a conventional silent film. This film is encased in a cassette. The cassette with the film contained therein is inserted into the cassette-receiving chamber of a camera to use the film. The sound film cassette has an opening for exposure and an opening for sound recording provided on the body of the cassette at two different positions. Within the body of the cassette, there are disposed coaxially a supply spool and a take-up spool. The sound film contained in the cassette is reeled up onto the take-up spool from the supply spool passing through the opening for exposure and the opening for sound recording.

Various types of sound motion picture cameras adapted for such sound film, are also known and commercially available. For example, mention may be made of U.S. Pat. No. 3,880,504, U.S. Pat. No. 771,864, U.S. Pat. No. T 920,009 (Defensive Publication) and U.S. Pat. No. 3,825,327. These known sound motion picture cameras are provided with some particular elements and devices which silent motion picture cameras conventionally used for a long time do not have. A sound motion picture camera is distinguished from a silent motion picture camera in that for the former there are additionally provided at least two devices, that is, a sound recording circuit device comprising a magnetic head for magnetically recording sound information on the magnetic recording material of the sound film and a film feeding device for transporting the sound film at a substantially constant speed directing it to the magnetic head.

At a position correctly aligned with the above mentioned image recording location in the cassette-receiving chamber where the opening for exposure of the cassette is to be located when the sound film cassette is properly loaded into the chamber, there are disposed an image forming device of the sound motion picture camera and the first film feeding device which engages with the sound film to intermittently transport it toward the opening for sound recording. Also, at a position correctly aligned with the above mentioned sound recording location in the chamber, the camera has the magnetic head of the sound recording circuit device and the second film feeding device which engages with the sound film at the opening for sound recording so as to transport the film at a substantially constant speed relative to the magnetic head.

Thus, within the sound motion picture camera loaded with the sound film cassette, recording of image information on the loaded film is effected at the position of the opening for exposure through the image forming device and recording of sound information associated with the image information is effected at the position of the opening for sound recording on the magnetic recording material applied to the same film through the magnetic head.

Image information and sound information associated with each other and recorded together on one and the same sound film are shifted from each other by a given distance with respect to the position of the recorded information on the film. This distance from the image information to the sound information on one and the same sound film is standardized to correspond to about eighteen picture frames for all such sound films manufactured by different film manufacturers. Therefore, the information recorded on the sound film may be reproduced by using a moving picture projector of any manufacturer. The standardization of shift distance from image information to sound information assures of matching of image to sound without distinction of manufacturer of projector to be used. However, on the other hand, in view of the camera side, this requires a precise feeding of film within a sound motion picture camera. The length of film segment existing between a part of the film carrying image information recorded thereon and a part of the film carrying sound information recorded thereon should be maintained always approximately constant. In other words, the speed at which the first film feeding device intermittently transports the film for a unit of time and the speed at which the second film feeding device substantially constantly transports the film for the same unit of time should be maintained constant always. This is very difficult to actually attain. For example, power transmission apparatus and the like interposed between the first and second film feeding devices will cause some difference in speed between the two feeding devices even when a common driving motor is used for driving both the two devices. When two separate driving motors made according to the same standard are used one for the first film feeding device and another for the second one, it is very difficult practically to make equal the speed at which the first feeding device transports the film to the speed of the second one.

In case that the film transporting speed of the second one is lower than that of the first one, the length of film segment extending from the first feeding device to the second one is unduly increased to the extent that a jamming of the film may be caused and thereby the film may be bent and damaged. In such a case, the first and second film feeding devices can no longer operate properly.

On the contrary, if the film transporting speed of the second feeding device exceeds that of the first one excessively, the film will be subjected to an unduly large stretching force at the segment between the two feeding devices and the film portion lying at the opening for exposure of the cassette will be stretched at the time of exposure which in turn prevents image information from being recorded on the film exactly. In the worst case, there may occur damage and breaking of the film.

In order to avoid these troubles, it has been already known to provide a speed control device for sound motion picture cameras according to the prior art. The speed control device comprises a loop sensor for detecting the length of film segment extending between the two film feeding devices. When the film length is increased or decreased over or under a predetermined value of length, either one or both of the two film feeding devices are controlled to increase or decrease the film transporting speed so as to keep the length of the film segment almost constant. Sound motion picture cameras provided with such speed control device comprising a loop sensor are disclosed, for example, in U.S. Pat. No. T 920,009 (Defensive Publication), U.S. Pat. No. 4,003,643 and U.S. Pat. No. 4,000,496.

According to the prior art disclosed in the above-mentioned U.S. Pat. No. T 920,009 and U.S. Pat. No. 4,003,643, the first film feeding device is provided with a driving motor capable of being switched over from low speed to high speed or vice versa through a speed regulating circuit device. For the second film feeding device there is provided such driving motor which rotates at a substantially constant speed. A loop sensor senses the film segment between the two film feeding devices and controls the speed regulating circuit device according as the film length. When the length has become longer than a predetermined value, it is detected by the loop sensor and the speed of the driving motor for the first film feeding device is changed over to the low speed which is lower than the rotating speed of the driving motor for the second film feeding device. This changing-over of the motor speed is effected through the speed regulating circuit device. In a similar manner, when the length of the film segment existing between the two film feeding devices has become shorter than the predetermined value, the loop sensor detects it and changes over the driving motor for the first feeding device to the high speed condition through the speed regulating circuit device. The speed set for the high speed condition is higher than the rotating speed of the driving motor for the second film feeding device. Thus, the film length between the first and second film feeding devices is maintained at a certain given value.

In the arrangement disclosed in U.S. Pat. No. 4,000,496, the positional relation of the constant speed motor and the variable speed motor is reversed to that of the above described prior art. Namely, a driving motor rotating at a substantially constant speed is used for the first film feeding device and a driving motor the speed of which is changed over from a high speed to a low speed or vice versa through a speed regulating circuit device is used for the second one. The function of the speed control system disclosed in this U.S. Pat. No. 4,000,496 is entirely the same as that of the above described prior art. When the film length between the two feeding devices becomes too long, it is detected by a loop sensor and the speed of the driving motor for the second film feeding device is switched over through the speed regulating circuit device to the high speed that is higher than the rotating speed of the driving motor for the first feeding device. On the contrary, if the film length becomes too short, then the loop sensor detects it and the speed of the driving motor for the second film feeding device is switched over to the low speed which is lower than the rotating speed of the driving motor for the first one. Thus, like the cases of the above described prior art, the film length between the first and second film feeding devices is maintained almost constant at a predetermined value.

Speed control systems as disclosed in the above described U.S. Pat. No. T 920,009, U.S. Pat. Nos. 4,003,643 and 4,000,496 are all the same in the point that one driving motor provided for one of the two film feeding devices is changed in speed relative to another driving motor provided for the other one of the feeding devices so as to maintain substantially constant the film length extending between the two feeding devices. However, there is a possibility of such operational trouble that the film feeding device with a constant speed motor may stop transporting the film or the transportation of the film may become extraordinarily slow so that the other motor provided for the other film feeding device that is variable in speed gets out of control. If such trouble once occurred, the film would fall in jam between the two film feeding devices or the film would be subjected to an intolerably large tension stress. As a result, the film may be bent, damaged and broken. Also, the recording of image information or sound information on the film may result in failure.

All the prior art speed control systems described above have no means for preventing such possible trouble. They lack of safety of film and of recording the information. For the known sound motion picture cameras it is therefore required to take some measure with which safety of film and safe recording of information can be assured.

SUMMARY OF THE INVENTION

Accordingly, it is the primary object of this invention to provide a motion picture camera which includes means for automatically detecting the trouble of film transportation when the film feeding device becomes unable to transport the film normally and then automatically stopping the operation of the film feeding device.

Another object of the invention is to provide a motion picture camera of the type comprising a first and a second film feeding device which includes further means for maintaining the film length between the two film feeding devices constant and detecting means for automatically detecting the trouble when said maintaining means becomes no longer able to adjust the film length to the predetermined value.

A further object of the invention is to provide a motion picture camera of the above mentioned type which further includes stopping means for automatically stopping the film transporting operations of both the first and second film feeding devices when said maintaining means becomes no longer able to adjust the film length to the predetermined value and when this trouble is detected by said automatic stopping means.

Other and further objects, features and advantages of the invention will appear more fully from the following description taken in connection with the accompanying drawings.

BRIEF DESCRIPTION OF THE DRAWINGS

FIGS. 6a-f shows various wave forms obtainable in the control circuit.

DESCRIPTION OF THE PREFERRED EMBODIMENTS

Figure 1:
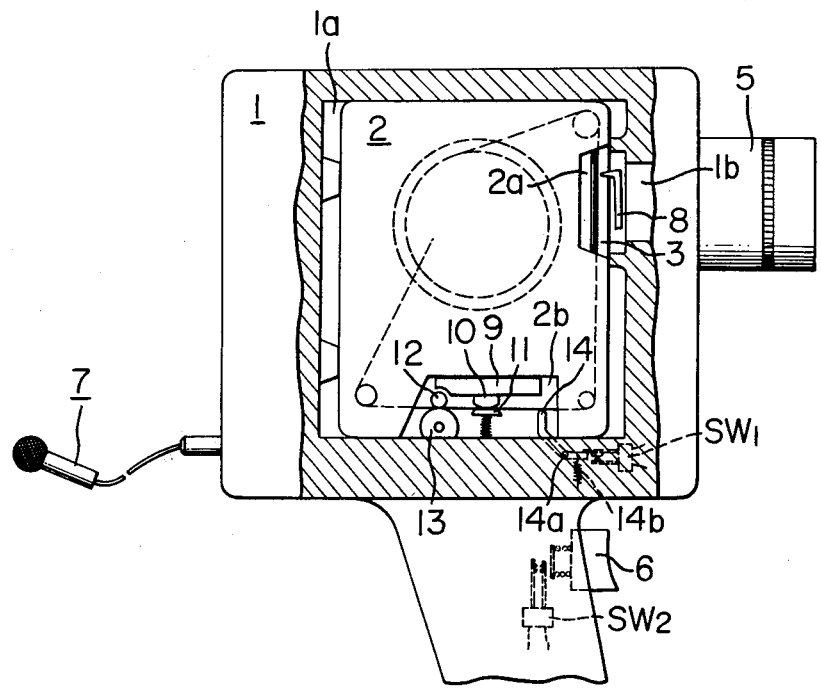
FIG. 1 is an elevational view of a sound motion picture camera according to the present invention with the side panel being partly broken away to illustrate an arrangement of the essential parts thereof.

Referring now FIGS. 1 through 4, there is shown an embodiment of the sound motion picture camera according to the invention.

Designated by 1 is a housing of the motion picture camera. The housing 1 has a cassette receiving chamber 1a in which a sound film cassette 2 is received and an image gate for exposure 1b opened in the chamber 1a. The cassette 2 is a sound film cassette of the type as disclosed in U.S. Pat. No. 3,858,968 and commercially available. The sound film cassette 2 has an opening for exposure 2a and an opening for sound recording 2b. When the cassette 2 is inserted into the chamber 1a, the opening 2a is positioned at the image recording location of the chamber 1a facing the image gate 1b of the camera housing and the opening 2b is positioned at the sound recording location of the chamber 1a. The sound film 3 contained in the cassette 2 is wound off from a supply spool provided in the cassette and wound up on a take-up spool arranged coaxially with the supply spool after passing through the opening for exposure 2a and the opening for sound recording 2b. The sound film 3 has a strip of magnetic recording material along one side on one surface of the film.

Designated by 5 is a photo-taking lens tube in which a photo-taking lens system is arranged in a known manner. Through the lens system, an image of an object is formed which is to be recorded on the sound film 3 located at the image recording location in the chamber 1a. The operator can control a normally open type trigger switch $SW_2$ externally of the camera housing 1 with the aid of a trigger button 6, which is always biased so as to normally project out of the camera housing 1. When the operator depresses the button 6 against the biasing force, the button comes in contact with the trigger switch $SW_2$ to close it. A microphone 7 is removably connected to a microphone input jack mounted on the camera housing 1 as illustrated in FIG. 1. The reference numeral 8 designates a pull-down claw which intermittently engages with a film perforation of the sound film at the position of the opening for exposure 2a and serves to transport the film 3 toward the opening for sound recording 2b passing through the film gate 2b. This pull-down claw is actuated in a manner known per se. At the sound recording location there is disposed a position regulating member 9 on which a magnetic head 10 of a known sound recording device is held. Like a well-known position regulating member used in a conventional sound motion picture camera, the position regulating member 9 is also designed as to allow the charging of a silent film cassette in the camera. When a silent film cassette is inserted into the cassette-receiving chamber 1a, the position regulating member 9 effects positioning of the silent film cassette in the chamber 1a.

Designated by 11 is a pressure pad which is disposed opposed to the magnetic head 10 across the path of film in the chamber 1a and serves to press the sound film against the magnetic head 10. Also, at the sound recording location there is disposed a capstan 12 which is driven by the driving force of motor Mc and rotates at a substantially constant speed. A pinch roller 13 which, together with the capstan, constitutes film feeding means to transport the sound film 3 at the opening for sound recording 2b at a substantially constant speed. The capstan 12 and the pinch roller 13 cooperating with it are arranged opposed to each other across the film path in the chamber 1a.

In order to sense a segment of the film 3 extending from the film gate 1b to the magnetic head 10 and detect the length of film segment existing therebetween, a sensing member 14 is provided. The sensing member 14 has a pivot 14a supported by the housing 1 and is pivotally movable around the pivot. The sensing member is also under the action of a tension spring 14b and normally biased by the spring as to rotate clockwise. A normally closed switch $SW_1$ is actuated by the swinging movement of the sensing member 14. The switch remains closed so long as the sensing member is in the position clockwise rotated under the action of the tension spring. When the sensing member is rotated pivotally counter-clockwise against the spring force, the switch is opened by a portion of the sensing member 14.

In the above described arrangement of sound motion picture camera, it is assured that the length of film which the pull-down claw 8 intermittently transports per a unit of time from the position of the opening for exposure 2a toward the opening for sound recording 2b is approximately equal to that transported from the opening for sound recording 2b per the same unit of time at a substantially constant speed. But, note should be taken to the fact that while the film feeding means comprising the capstan 12 and the pinch roller 11 transports the sound film 3 at a constant speed, another film feeding means comprising the pull-down claw 8 transports the film 3 intermittently. This difference in the manner of film transportation has an effect on the length of film between the film gate 1b and the magnetic head 10 which is predetermined. As will be easily understood, in the position of film just after the pull-down claw 8 has pulled down the sound film 3 by an amount of one picture frame, the length of film existing between the film gate 1b and the magnetic head 10 becomes somewhat longer than the predetermined film length. As a result, the sensing member 14 being in contact with the under surface of the sound film 3 at the sound recording opening 2b is urged to rotate counter-clockwise due to the weight of the sound film itself and thereby the switch $SW_1$ is opened. During the time interval from the completion of pulling-down of the film by one picture frame to the beginning of pulling-down of it by the next frame with the claw 8, the sound film between the film gate 1b and the magnetic head 10 is further transported in the downstream direction by the film feeding means comprising capstan 12 and pinch roller 13. Therefore, the length of film between the film gate 1b and the magnetic head 10 is gradually reduced to the predetermined length followed by the clockwise rotation of the sensing member 14 which results in re-closing of the switch $SW_1$. In this manner, opening and closing of the switch $SW_1$ are repeated cyclically every time when the pull-down claw 8 transports the film downwards by one step corresponding to the film length of one picture frame. While in this embodiment the detection of the film length is carried out mechanically by means of sensing member 14 and switch $SW_1$, it may be also carried out photoelectrically without the film being touched with detecting means in a manner as disclosed in U.S. Pat. No. 3,901,590. In this case, light to which the film is not sensitive, for example, infrared light has to be used as the light source for the photoelectric detection.

Designated by 15 is a gear fixedly mounted on the output shaft of a motor $M_F$ to actuate the pull-down claw 8. The gear 15 is always in mesh with a gear 16 firmly mounted on a rotary shaft 17 supported by the camera housing 1. Meshed also with the gear 16 is a gear 18 mounted on a rotary shaft 19 supported by the housing 1. On the rotary shaft 19 there is secured also a worm gear 20 in mesh with a worm wheel 21 rotatably mounted on a shaft supported on the housing. The reference numeral 23 designates a film take-up shaft rotatably journaled coaxially with the worm wheel. The film take-up shaft and the worm wheel are in contact with each other through a friction member (not shown) interposed therebetween. The film take-up shaft 23 has a pawl with which the take-up shaft of the film cassette comes in engagement when the cassette is inserted into the cassette-receiving chamber 1a. When engaged with the pawl, the take-up shaft of the film cassette can be rotated together with the film take-up shaft 23, the rotation of which is caused by the rotation of the worm wheel 21 through the above described friction member. A rotary body 24 is secured on the rotary shaft 19. On the rotary body 24 there are provided pieces of electrically conductive material 24a, 24b. A contact holder 20 disposed in the vicinity of the rotary body has conductive contact pieces $25_1$–$25_4$. The conductive pieces $25_1$ and $25_2$ cooperate with the conductive section 24a on the rotary body 24 to constitute a phase switch $SW_3$. The conductive pieces $25_3$ and $25_4$ together with the conductive segment 24b on the rotary body constitute another phase switch $SW_4$. The phase switch $SW_3$ operates in such manner that when the shutter blade 26 is in a position in which the aperture E of film gate plate is opened and an exposure of the film is effected, the conductive segment 24a electrically connects the contact piece $25_1$ with the contact piece $25_2$ so as to allow a flow of electric current therebetween and when the aperture E is closed by the shutter blade to terminate the exposure of the film, the conductive segment 24a is brought to a position in which the current flow between the contact pieces $25_1$ and $25_2$ is cut off. Thus, every time when the film is exposed and transported by an amount of one picture frame, one on-off operation of the phase switch $SW_3$ is effected. In the same manner, with the rotation of the rotary body 24, the conductive segment 24b on the rotary body makes up or cuts off the electric connection between the contacts pieces $25_3$ and $25_4$ in the other phase switch $SW_4$.

Designated by 27 is a gear secured on a shutter shaft 28 rotatably supported on the housing 1. The gear 27 is in mesh with the gear 18 and has a cam 27a and a first shutter blade $26_1$ fixed thereon. The cam 27a serves to bring into operation a film feeding mechanism with which the pull-down claw 8 is actuated. Rotatably mounted on the shutter shaft 28 is a rotary cylinder 29 to which a second shutter blade $26_2$ is fixed. Also, a slide cylinder member 30 is a slide-movably mounted on the rotary cylinder 29. When the slide member 30 slides on the rotary cylinder 29, the latter is rotated interlockingly with the slide movement of the former so that the positional relation between the shutter blades $26_1$ and $26_2$ is changed to adjust the angle of shutter opening formed by the two shutter blades $26_1$ and $26_2$ which together constitute one shutter. Such means for adjusting the angle of shutter opening is known in the art.

Driving power of the motor $M_F$ is transmitted to the gear 18 through the gears 15 and 16 so as to rotate the rotary shaft 19 and the gear 27 and therefore to rotate the shutter shaft 28. A capstan motor Mc supported on the housing 1 is used to drive the capstan 12. The rotational speed of the capstan 12 is made constant by means of a fly-wheel 31 which serves also as a pulley. A pulley is fixed to the output shaft of the motor Mc and extending between the pulley and the fly-wheel there is an endless belt 35. The driving power of the motor Mc is transmitted to the fly-wheel 31 so as to rotate the capstan 12 at a substantially constant speed. A rotary shaft 33 rotates with the operating motion of the trigger button 6. Fixed to the rotary shaft 33 is a swing member 32 having a pivot pin 34 secured thereon. On the pivot pin 34, the pinch roller 13 is rotatably mounted. Thus, when the shaft 33 is rotated together as the trigger button 6 is depressed by the operator, the pinch roller 13 is brought into resilient contact with the capstan 12 as a result of the rotation of the shaft 33. The resilient contact of the pinch roller with the capstan is released when the trigger button is returned to its starting position.

Figure 3:
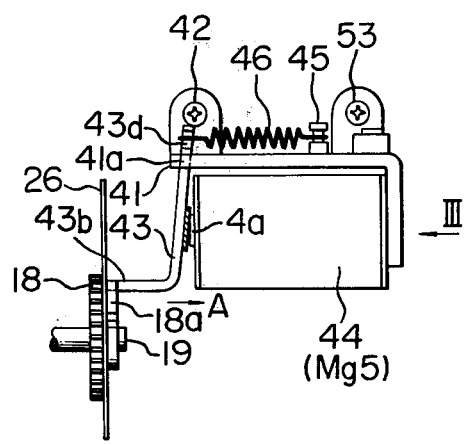
FIG. 3 shows in detail, in side view, an electromagnetic release device useful for controlling the motion of shutter device used in the sound motion picture camera.
Figure 4:
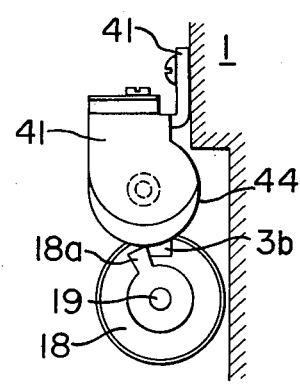
FIG. 4 is a view of the electromagnetic release device as viewed along the arrow line III in FIG. 3.
Figure 2:
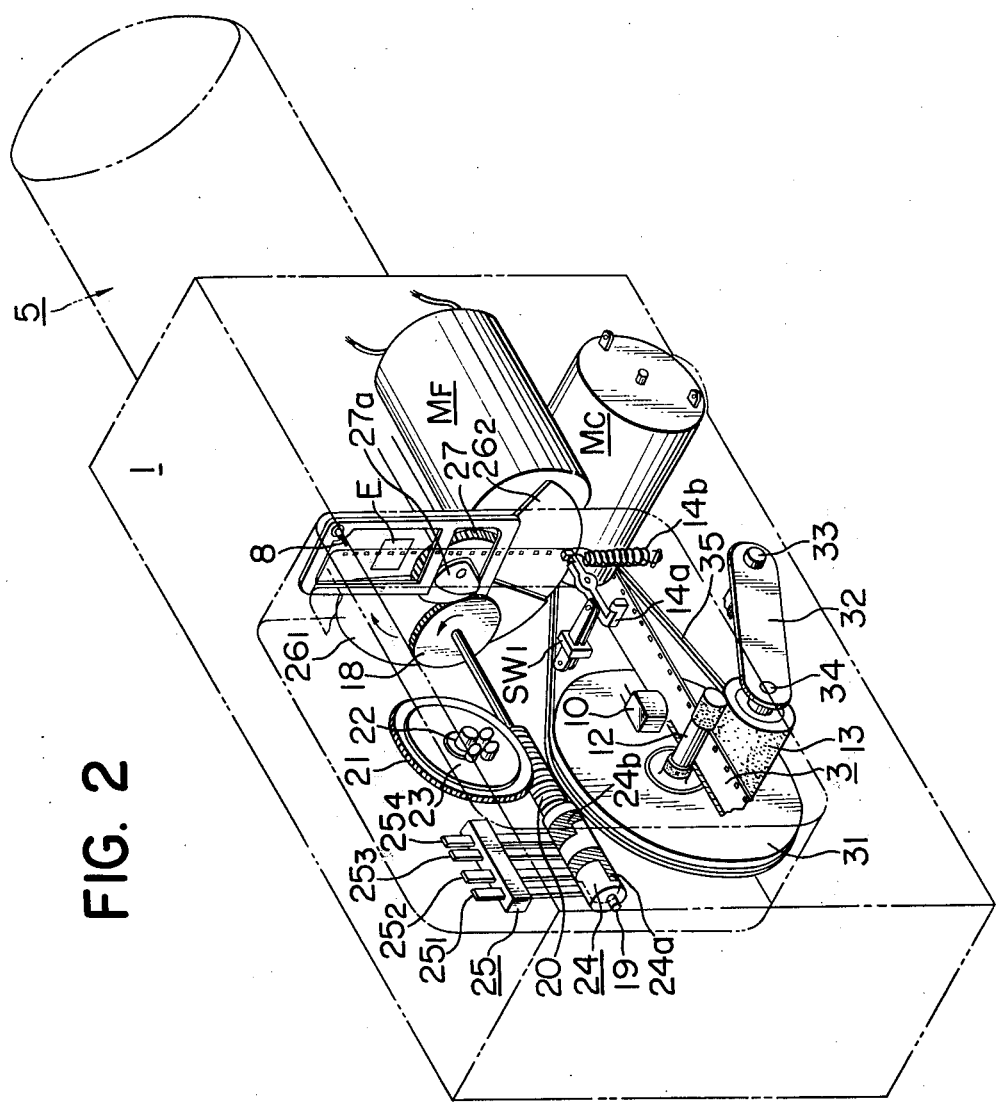
FIG. 2 is a perspective view of the sound motion picture camera showing the arrangement of main components thereof.

Referring to FIGS. 3 and 4, the structure of the electromagnetic device shown in FIGS. 1 and 2 will be described in detail.

The gear 18 has a stop projection 18a. Designated by 41 is a base member secured to the housing 1 by means of screw nuts 42, and 53. The base member 41 holds an electromagnetic coil 44. The reference numeral A field yoke is 4a and 43 is a blocking member, one end of which is biased in one direction under the action of a tension spring extending between the one end and an anchor pin 45 on the base member. When current is introduced into the electromagnetic coil 44 and thereby the field yoke 4a is magnetized, the yoke 4a draws the blocking member 43. Thereby, the blocking member swings in the direction of arrow A in FIG. 3 to a position at which the member 43 can no longer engage the stop projection 18a of the gear 18. On the contrary, when the current flowing to the coil 44 is cut off and the magnetic attraction by the yoke 4a is released, the blocking member 43 again swings in the direction opposite to the arrow A by the action of the tension spring 46 up to the position at which the blocking member 43 comes into engagement with the stop projection 18a to stop the gear 18 at a desired position.

Figure 5:
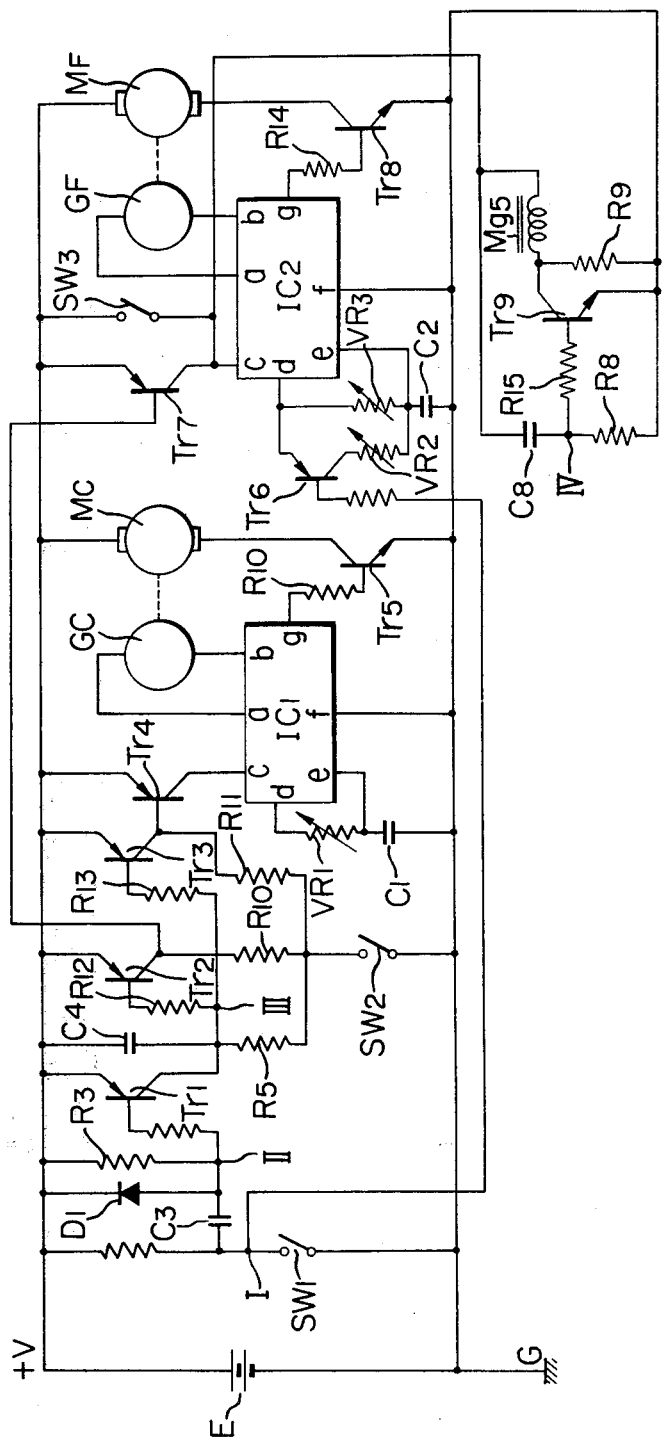
FIG. 5 is a circuit diagram of control circuit used for the sound motion picture camera according to the invention.

FIG. 5 shows a circuit used for driving and controlling the motion picture camera shown in FIGS. 1–4. In FIG. 5, the same reference numerals and characters as used in FIGS. 1–4 designate the same members and elements having the same functions as described above.

Referring to FIG. 5, Gc is a tacho-generator for detecting the rotational speed of the motor Mc. The tacho-generator Gc is connected to the output of the motor Mc. To control the speed of the motor Mc there is provided a speed control integrated circuit IC, which may be, for example, an integrated circuit of the type No. IC-TCA 955 supplied by SIEMENS Corporation. The input terminals a and b are connected to the output terminals of the tacho-generator Gc, respectively. $VR_1$ is a variable resistance and $C_1$ is a condenser connected with $VR_1$ in series. The variable resistance $VR_1$ and the condenser $C_1$ together constitute a variable time constant circuit which determines the reference rotational speed of the motor Mc. Information of the reference rotational speed of the motor Mc is given to the resistance value of the variable resistance $VR_1$. The above-mentioned variable time constant circuit is connected to the terminals d and e of the integrated circuit $IC_1$. The information of reference rotational speed set in the variable resistance $VR_1$ is put into the integrated circuit $IC_1$, via its terminal e. Tr5 is a transistor, ON-OFF of which is controlled by the integrated circuit $IC_1$. The base of transistor Tr5 is connected to the output terminal g through a resistance $R_{10}$, the emitter thereof of grounded and the collector is connected to the motor Mc. When the transistor Tr5 is turned on, a power supply path to the motor Mc is formed.

In this manner, the above described elements, tacho-generator Gc, integrated circuit $IC_1$, variable time constant circuit, resistance $R_{10}$ and transistor Tr5 constitute a constant speed control apparatus for the motor Mc. In this control apparatus, a pulse signal is put out from the output terminal g of the integrated circuit the duty ratio of which signal is controlled so as to maintain the speed of the motor Mc almost constant, using the information of the rotational speed obtained by the tacho-generator Gc from the motor Mc and the information of the reference rotational speed set by the variable resistance $VR_1$.

GF is a tacho-generator for detecting the rotational speed of the motor $M_F$ used to drive the film feed mechanism by which the film pull-down claw 8 is actuated. The tacho-generator GF is connected to the output of the motor $M_F$. To control the speed of the motor $M_F$, there is provided an integrated circuit $IC_2$ which is of the same type as the above described $IC_1$. The output terminals of the tacho-generator GF are connected to the input terminals a and b of the intergrated circuit $IC_2$, respectively. Tr6 is a transistor to which two variable resistances $VR_2$ and $VR_3$ are connected in series. The two variable resistances are connected in parallel each other. $C_2$ is a condenser connected to the variable resistances in series. The variable resistances $VR_2$ and $VR_3$ and the condenser $C_2$ together constitute a variable time constant circuit which determines the reference rotational speed of the motor $M_F$. The collector of the transistor Tr6 is connected to the variable resistance $VR_2$ of the variable time constant circuit ($C_2$, $VR_2$, $VR_3$), its emitter is connected to $VR_3$ and terminal d of $IC_2$ and its base is connected to the switch $SW_1$ through the point I. The transistor Tr6 is controlled in the following manner:

As previously described, just after the film pull-down claw 8 has transported the film 3 by an amount of one picture frame, the film length between the film gate 1b and the magnetic head 10 is somewhat increased and thereby the sensing member 14 is rotated counter-clockwise so as to open the switch $SW_1$. Upon this opening of the switch $SW_1$, the transistor Tr6 turns OFF and it cuts off the variable resistance $VR_2$ from the abovementioned variable time constant circuit for controlling the speed of the motor $M_F$.

During the time interval after the pull-down claw 8 has transported the film by one picture frame and before it starts pulling down the next frame of the film, the film length between the film gate 1b and the magnetic head 10 is reduced to the determined length because film feed means comprising the capstan 12 and the pinch roller 13 continues rotating to transport the film further to the downstream side without any interruption for the time interval. With the decrease of the excess length of the film between the film gate 1b and the magnetic head 10, the sensing member 14 is gradually rotated clockwise and finally the switch $SW_1$ is closed as a result of the rotation of the sensing member. Upon the time of the switch being closed, the transistor Tr6 is turned ON and it connects again the resistance $VR_2$ to the variable time constant circuit. In this manner, in response to ON-OFF operation of the switch $SW_1$, the transistor Tr6 switches over the information of the reference rotational speed set in the variable time constant circuit for controlling the speed of the motor $M_F$.

As to the reference rotational speed, the variable time constant circuit is designed to have the following set information:

When both of the resistances $VR_2$ and $VR_3$ are connected to the condenser $C_2$ in parallel in the circuit, there is set in the circuit such reference rotational speed information that will give the motor $M_F$ such speed that the film 3 is transported by the film pull-down claw 8 at the speed of 20 (twenty) picture frames/sec. When only the resistance $VR_3$ is connected to the condenser $C_2$, there is set in the circuit such reference rotational speed information that will give the motor such speed that the film is transported by the claw 8 at the speed of 16 (sixteen) picture frames/sec.

Tr8 is a transistor, ON-OFF of which is controlled by the above described integrated circuit $IC_2$. The base of this transistor Tr8 is connected to the output terminal g of said $IC_2$ through a resistance $R_{14}$ and its collector is connected to the motor $M_F$. $C_3$ is a condenser which constitutes, together with the resistance $R_3$, a differentiation circuit. When the switch $SW_1$ responding to the sensing member 14 is turned ON, the condenser $C_3$ applies a negative pulse to the base of the transistor Tr1 to turn it ON. Connected to the collector-emitter step of the transistor Tr1 is a condenser $C_4$ which is in turn connected to trigger switch $SW_2$ in series via a resistance $R_5$. Tr2 and Tr3 are switching transistors, the bases of which are connected to the output terminal (point III) of the condenser $C_4$ through resistances $R_{12}$ and $R_{13}$, respectively. Their collectors are connected to the trigger switch $SW_2$ through resistances $R_{10}$ and $R_{11}$, respectively. These transistors Tr2 and Tr3 detect the output of the condenser $C_4$ and become ON when the output voltage of the condenser $C_4$ becomes lower than a predetermined level. Transistor Tr4 controls power supply. The collector of the transistor Tr4 is connected to the input terminal c of $IC_1$ and the base is connected to the collector of transistor Tr3. When Tr3 is OFF, Tr4 conducts power supply to the integrated circuit $IC_1$. Transistor Tr7 is also a transistor for controlling power supply. The collector of said Tr7 is connected to the input terminal c of $IC_2$ and its base is connected to the collector of transistor Tr2. When Tr2 is OFF, said Tr7 conducts power supply to the integrated circuit $IC_2$.

Resistance $R_8$ and condenser $C_8$ form a time constant circuit, the output terminal III of which is connected to the base of transistor Tr9 through a resistance $R_{15}$. The collector of the transistor Tr9 is connected to the electromagnetic coil Mg5 of the electromagnetic device shown in detail in FIG. 3 so as to control the power supply to the coil Mg5. Resistance $R_9$ is used to supply a holding current to the coil Mg5. The circuit containing these elements, resistances $R_8$, $R_9$, $R_{15}$, condenser $C_8$, transistor Tr9 and electromagnetic coil Mg5 is a stopper circuit for controlling the operation of the electromagnetic device shown in detail in FIG. 3. This stopper circuit can operate as a power saving type circuit. Namely, when the trigger switch $SW_2$ is turned ON by depressing the trigger button 6, the stopper circuit turns the transistor Tr9 ON so as to introduce a larger current into the electromagnetic coil Mg5 for the time length determined by the condenser $C_8$ and the resistance $R_8$. This makes it easy to release the engagement between the blocking member 43 and the stop projection 18a. After disengagement, the circuit supply power to the coil Mg5 through the resistance $R_9$ so as to maintain the blocking member 43 in the disengaged position with only a smaller amount of current.

Now, the manner of operation of the above described motion picture camera will be described with reference to FIG. 6 showing various wave forms.

When the operator depresses the trigger button 6, the trigger switch $SW_2$ is closed responding to the motion of the button. This closing of the switch $SW_2$ causes the base potentials of transistors Tr4 and Tr7 to lower and to turn the transistors ON. As a result, power is supplied to the speed control integrated circuits $IC_1$ and $IC_2$. Now, $IC_1$ and $IC_2$ are brought into operation and depending upon the reference speed information set by resistance $VR_1$ the capstan driving motor Mc starts rotating at a constant speed. At the same time, the motor $M_F$ also starts rotating at a constant speed to drive the film pull-down claw 8. Power is also supplied to a sound recording circuit (not shown) comprising the magnetic head 10 as well as to the electromagnetic coil Mg5 as a result of the closing of the switch $SW_2$. The blocking member 43 is released from the engagement with the stop projection 18a so that picture taking accompanied with simultaneous sound recording is started.

At this stage of operation, transistor Tr6 is ON and variable resistance $VR_2$ is in connection to the variable time constant circuit for controlling the speed of motor $M_F$, provided that the set speed of shooting with simultaneous recording on the film be 18 picture frames/sec. and switch $SW_1$ be in its closed position after loading of the film 3 and before the actuation of pull-down claw 8, that is, before the actuation of motor $M_F$. Starting from this position, when the motor $M_F$ to which reference speed information corresponding to 20 picture frames/sec. has been set, is started rotating, it rotates at a rotational speed which makes the pull-down claw 8 transport the film at a rate of 20 frames/sec. Therefore, when the pull-down claw 8 has just pulled down the film 3 by one picture frame, the length of film existing between the film gate 1b and the magnetic head 10 becomes longer than the predetermined film length and thereby the sensing member 14 is rotated counter-clockwise so as to open the switch $SW_1$. Upon this opening of switch $SW_1$, transistor Tr6 becomes OFF and the variable resistance $VR_2$ is cut out from the variable time constant circuit for controlling the speed of motor $M_F$. As a result, the rotational speed of the motor $M_F$ is reduced to a speed which makes the pull-down claw 8 transport the film at a rate of 16 frames/sec. This reduced speed continues until the next pulling-down of the film by the claw 8 is started. For this time interval the pull-down claw is slowly reset to its starting position ready for pulling down the next picture frame of the film by the motor $M_F$ the rotational speed of which has been decreased as mentioned above.

On the other hand, for this time interval, another film feed means comprising capstan 12 and pinch roller 13 continues rotating at a constant speed without any interruption and therefore it continues transporting the film 3 between the film gate 1b and the magnetic head 10 further downstream at a rate of about 18 frames/sec. As a result, the film length between the film gate and the magnetic head is gradually reduced for this time interval and just before the film pull-down claw is actuated to begin pulling down of the film 3 by the next picture frame thereof, the switch $SW_1$ is again closed and thereby the rotational speed of the motor $M_F$ is once more increased. In this manner, during one cycle of operation of the film pull-down claw 8, the motor $M_F$ rotates at two different speeds, that is, an increased speed corresponding to a film transportation rate of 20 frames/sec. and a decreased speed corresponding to 16 frames/sec. The arithmetical mean thereof is 18 frames/sec. which is the actual shooting speed with simultaneous sound recording on the film. Therefore, on an average it may be said that the film pull-down claw 8 is driven as to transport the film 3 at a rate of 18 frames/sec.

As will be understood from the foregoing, the sensing member 14 is swing-moved at a mean frequency of 18 Hz with the intermittent transportation of the film by the pull-down claw 8. Accordingly, the switch $SW_1$ responding to the sensing member 14 also repeats its ON-OFF operation at the same frequency of 18 Hz as shown in FIG. 6 (a). For the reason, the wave form obtained at the point I is of 18 Hz pulse wave as shown in FIG. 6 (b). This pulse wave is applied to the differentiation circuit comprising condenser $C_3$ and resistance $R_3$. When it is differentiated in the circuit, however, the diode $D_1$ clips the position portion of the wave form. Therefore, at the point II, there appears a negative pulse as shown in FIG. 6 (c). The transistor Tr1 becomes turned ON momentarily in response to the negative pulse and ON-OFF of the transistor is repeated at a frequency of 18 Hz as shown in FIG. 6 (d). Condenser $C_4$ is charged through resistance $R_5$ when the trigger switch $SW_2$ is ON and the transistor Tr1 is OFF, and it is discharged when the transistor Tr1 is ON. Therefore, the cycle of charge-discharge is repeated in the condenser $C_4$ in response to ON-OFF of the transistor Tr1. As a result, the potential at the point III varies as shown in FIG. 6 (e). So long as the switch $SW_1$ responding to the sensing member 14 is normally operating and repeating its ON-OFF correctly at the frequency of 18 Hz, the potential at the point III takes a value lying between the source voltage $+V$ and a predetermined voltage $+V'$ (threshold level of transistors Tr2, Tr3). Therefore, during the switch $SW_1$ being operating normally, transistors Tr2 and Tr3 are remained OFF and transistors Tr4 and Tr7 are remained ON so that power supply to $IC_1$ and $IC_2$ are continued and shooting on the film 3 is allowed to carry out continuously.

Although photo-taking with the motion picture camera can be continued smoothly so long as the normal operational position is kept as described above, there is possibility of the ON-OFF operation of switch $SW_1$ being stopped for any reason during shooting. According to the arrangement of the present invention, if such trouble occurred, the driving of motors Mc and $M_F$ are stopped automatically in the following manner:

Terminating of ON-OFF operation of switch $SW_1$ responding to the sensing member 14 may be caused, for example, when one film feed means comprising the film pull-down claw 8 becomes unable to transport the film while another film feed means comprising capstan 12 and pinch roller 13 is in the normal operation to transport the film. In this case, the film between the film gate 1b and the magnetic head 10 remains tight and can not have the excess length necessary to open the switch $SW_1$. Therefore, the switch remains always closed. A similar trouble may be caused when the one film feed means operates well but the other feed means including capstan and pinch roller can not function effectively to transport the film 3. In this case, the film length between the film gate and the magnetic head is increased step by step and therefore the switch $SW_1$ will remain always opened.

In either case, at the point II there no longer appears any differentiation pulse. Transistor Tr1 is remains OFF continuously from the time point when ON-OFF operation of switch $SW_1$ is stopped. Since the discharge path for condenser $C_4$ is no longer formed, the condenser continues to be charged and thereby the potential at the point III is lowered below the predetermined voltage $+V'$. When the potential at the point III is dropped down to a level under $+V'$ in this manner, transistors Tr2 and Tr3 become ON and transistors Tr4 and Tr7 are turned OFF so that power supply to $IC_1$ and $IC_2$ is stopped and therefore motors Mc and $M_F$ stop rotating.

Thus, when the cyclic swing motion of the sensing member 14 is stopped and when the ON-OFF operation of switch $SW_1$ continues stopping for a certain period, the motors Mc and $M_F$ are automatically stopped to terminate the photo-taking operation in spite of the fact that the trigger button 6 is depressed and the switch $SW_2$ is closed. In this manner, photo-taking is automatically prevented when the sensing member does not function correctly.

In this embodiment, it is also assured that photo-taking operation is finally terminated only after the shutter 26 has been moved to close the exposure aperture E even when transistors Tr4 and Tr7 become OFF and the motors Mc and $M_F$ are stopped during shooting. To this end, the embodiment shown in FIG. 2 includes a switch $SW_3$. The switch $SW_3$ is so formed that it remains closed so long as the shutter 26 is in the position to open the aperture E. Therefore, in this position power supply to $IC_2$ is continued through the switch $SW_3$ even when transistor is turned OFF. The power supply to the integrated circuit $IC_2$ is never stopped until the exposure aperture E has been closed by the shutter 26 and the switch $SW_3$ has been opened thereby. Thus, in this embodiment, even when transistor Tr7 becomes turned OFF under the phase of the aperture E being open, power supply to $IC_2$ is maintained until the shutter 26 has closed the aperture. Only after the aperture is closed, the motor $M_F$ is stopped and power supply to the electromagnetic coil Mg5 is also stopped so as to cause the blocking member 43 engage with the stop projection 18a at a predetermined position. There never occurs the situation wherein the photo-taking motion of the camera is stopped while the aperture E is maintained opened by the shutter 26.

While the invention has been particularly shown and described with reference to the preferred embodiments thereof, it will be understood by those skilled in the art that the foregoing and other changes in form and details can be made therein without departing from the spirit and scope of the invention.

What we claim is:

1. A sound motion picture camera capable of using a sound film, said camera comprising:
    (a) a housing having a film receiving chamber including therein an image recording location and a sound recording location, and an image gate opened into the chamber at a position corresponding to said image recording location;
    (b) sound recording means disposed in said chamber for recording sound signals on the film passing through said sound recording location;
    (c) film feed means disposed in said chamber and comprising a first feed means engageable with the film at said image recording location and capable of transporting the film intermittently along the area of said image gate and a second feed means engageable with the film at the sound recording location and capable of transporting said film along the film path of said sound recording means at a substantially constant speed;
    (d) driving means for actuating said first and second feed means, said driving means including at least a motor operatively coupled with said film feed means;
    (e) sensing means so disposed in said chamber as to produce a signal in response to increase and decrease of film length occurred between said first and second feed means every time when said first feed means has transported the film by one picture frame thereof; and
    (f) control means including circuit means for detecting the wave form of the output produced from said sensing means and stopping the driving of said driving means when a waveform other than a predetermined waveform is detected.

2. A sound motion picture camera as claimed in claim 1, wherein said circuit means comprises:
    a timer circuit means which is actuated every time a signal is put out from said sensing means and which, without the next signal being put out from said sensing means, puts out a stop signal at a predetermined time after being so actuated, and switching circuit means for forming a power supply path to said motor of said driving means and also for cutting off said power supply path in response to the stop signal coming from said timer circuit means.

3. A sound motion picture camera as claimed in claim 1, wherein said driving means includes a first motor operatively coupled with said first feed means and speed regulating means, and a second motor operatively coupled with said second feed means.

4. A sound motion picture camera as claimed in claim 2, wherein said speed regulating means is able to change over the speed of said first motor between a first speed higher than the rotational speed of said second motor and a second one lower than the rotational speed of said second motor, in response to the output of said sensing means.

5. A sound motion picture camera as claimed in claim 1, wherein said sensing means comprises a sensing member in contact with a segment of the film extending between said image recording location and said sound recording location and swingable in response to increase and decrease of the film length between said two locations and a switch device, ON-OFF of which is controlled by the swing motion of said sensing member.

6. A sound motion picture camera as claimed in claim 2, wherein said timer circuit means includes a time constant circuit comprising a condenser and a resistance and control means for controlling the charge and discharge of said condenser, which control means forms a discharge path to said condenser for a predetermined time length and allows charging to said condenser after discharging.

7. A sound motion picture camera as claimed in claim 6, wherein said switching means detects the output of said time constant circuit and conducts switching when the condenser has been charged up to a predetermined potential so as to cut off power supply to the motor of said driving means.

8. A sound motion picture camera as claimed in claim 6, wherein said control means includes switching means connected to said condenser in parallel, which switching means becomes turned ON and, after maintaining the state of ON, becomes turned OFF, in response to the output signal coming from said sensing member.

9. A sound motion picture camera as claimed in claim 8, wherein said switching means is a transistor which becomes turned ON in response to the output signal coming from said sensing member.

10. A sound motion picture camera for exposing a sound film strip contained in a cassette which has a first opening for exposure of the film and a second opening for sound signal recording of the film, said camera comprising:
 (a) a housing having a cassette-receiving chamber;
 (b) first feed means in the housing engageable with the film of the inserted cassette at said chamber for intermittently transporting said film at said first opening of the cassette;
 (c) second feed means in the housing engageable with the film of the inserted cassette at said chamber for transporting said film at a substantially constant speed at said second opening;
 (d) driving means for actuating said first and second feed means;
 (e) sensing means being able to contact with a segment of said film extending between said first and second feed means and swingable in response to increase and decrease of the film length occurring between said first and second feed means every time said first feed means has transported the film by one picture frame;
 (f) switching means, ON-OFF of which is controlled in response to the swing motion of said sensing means; and
 (g) stopping means for detecting ON-OFF operation of said switching means and stopping the driving of said driving means whenever there is detected an absence of said ON-OFF operation of said driving means continued for a longer time than a predetermined time length.

11. A sound motion picture camera as claimed in claim 10, wherein said stopping means is formed by an electronic circuit.

12. A sound motion picture camera for exposing a sound film strip contained in a cassette which has a first opening for exposure of the film and a second opening for sound signal recording of the film, said camera comprising:
 (a) a housing having a cassette-receiving chamber;
 (b) first feed means in the housing engageable with the film of the inserted cassette at said chamber for intermittently transporting the film at said first opening;
 (c) second feed means in the housing engageable with the film of the inserted cassette at said chamber for transporting the film at a substantially constant speed at said second opening;
 (d) driving means for actuating said first and second feed means;
 (e) sensing means being able to contact with a segment of the film extending between said first and second feed means and swingable in response to increase and decrease of the film length occurring between said first and second feed means every time said first feed means has transported said film by one picture frame;
 (f) switching means, ON-OFF of which is controlled in response to the swing motion of said sensing means; and
 (g) control circuit means including, timer circuit means which is actuated by ON-OFF operation of said switching means and which produces a stop signal at a predetermined time after being actuated and switching circuit means for forming a power supply path to said driving means and cutting off said power supply path in response to the top signal of said timer circuit means.

13. A sound motion picture camera as claimed in claim 12, wherein said timer circuit means includes a time constant circuit comprising a condenser and a resistance and a semiconductor switching means for controlling charging and discharging of the condenser of said time constant circuit and wherein said switching circuit means conducts switching to cut off said power supply path when the charge potential of said condenser reaches a predetermined level.

14. A sound motion picture camera as claimed in claim 13, wherein said control circuit means includes a differentiation circuit which puts out pulses depending upon the ON-OFF operation of said switching means and wherein said semiconductor switching means is connected to said condenser in parallel so as to become and remain ON for a predetermined time length in response to the pulse coming from said differentiation circuit.

15. A sound motion picture camera adaptable for sound film, said camera comprising:
 (a) a housing having a film receiving chamber including therein an image recording location and a sound recording location, and an image gate opened into the chamber at a position corresponding to said image recording location;
 (b) trigger means for controlling the starting and stopping of said camera;
 (c) shutter means for selectively shutting out the object light coming into said chamber through said image gate, said shutter means including:
 a rotary shutter, stopper means operatively movable cooperating with said shutter means, blocking means selectively engaged with and disengaged from said stopper means so as to control through said stopper means the rotation of said shutter and the stop thereof, and electromagnetic means operative in response to the motion of said trigger means for actuating said blocking means;
 (d) sound recording means disposed in said chamber for recording sound signals on the film passing through said sound recording location;
 (e) film feed means disposed in said chamber and comprising a first feed means and a second feed means;
 said first feed means being engageable with the film at said image recording location to intermittently transport said film along the area of said image gate and said second feed means being engageable with the film at said sound recording location to transport said film along the film path of said sound recording means at a substantially constant speed;

(f) driving means for actuating said first and second feed means, said driving means including at least a motor operatively coupled with said film feed means;

(g) sensing means so disposed in said chamber as to produce a signal responding to increase and decrease of the film length occurring between said first and second feed means every time said first feed means has transported the film by one picture frame thereof; and (h) control means including:

speed regulating means for controlling said driving means in response to the output of said sensing means in such manner that the length of film extending between said image recording location and said sound recording location may be maintained substantially constant and stopping means for detecting the wave form of output of said sensing means and stopping the driving of said driving means when a waveform other than a predetermined waveform is detected.

16. A sound motion picture camera as claimed in claim 15, wherein said stopping means includes means for allowing power supply to said motor to be continued until said rotary shutter has reached a predetermined position.

17. A sound motion picture camera as claimed in claim 15, wherein said shutter comprises at least two shutter blades which are movable relative to each other and adapted for adjustment of said aperture opening for exposure.

18. A sound motion picture camera capable of using a sound film, said camera comprising:

(a) a housing having a film receiving chamber including therein an image recording location and a second recording location, and an image gate opened into the chamber at a position corresponding to said image recording location;

(b) sound recording means disposed in said chamber for recording sound signals on the film passing through the sound recording location;

(c) shutter means for selectively shutting out the light coming into said chamber from said image gate;

(d) film feed means disposed in said chamber and comprising a first feed means and a second feed means:

said first feed means being engageable with the film at said image recording location to intermittently transport said film along the area of said image gate and said second feed means being engageable with the film at said sound recording location to transport said film along the film path of said sound recording means at a substantially constant speed;

(e) first driving means for actuating said first feed means and said shutter means, said driving means including a motor operatively coupled with said first feed means and said shutter means;

(f) second driving means for actuating said second feed means, said driving means including a motor operatively coupled with said second feed means;

(g) sensing means so disposed in said chamber as to produce a signal in response to increase and decrease of the film length occurring between said first and second feed means every time when said first feed means has transported the film by one picture frame; and (h) control means including stopping means for detecting the wave form of the output of said sensing means and stopping the driving of said first and second driving means when a wave form other than a predetermined one is detected.

19. A sound motion picture camera as claimed in claim 18, wherein said stopping means includes means for allowing said first driving means to remain actuated until said shutter means has been brought into the position at which it shuts out the light coming into said chamber from said image gate.

20. A sound motion picture camera as claimed in claim 18, wherein said second feed means includes a capstan driven by said motor and a pinch roller which is brought into resilient contact with said capstan.

21. A sound motion picture camera as claimed in claim 18, wherein said shutter means includes:

a rotary shaft driven by said motor;

a shutter fixed onto said rotary shaft;

stopper means rotatably cooperating with said shutter;

blocking means selectively engaged with and disengaged from said stopper means so as to control the rotation of said shutter and the stop thereof through said stopping means; and an electromagnetic means for actuating said blocking means.

22. A sound motion picture camera as claimed in claim 18 wherein said stopping means comprises speed control integrated circuit means and electronic switching means for controlling said integrated circuit.

* * * * *